United States Patent [19]
Contonzo et al.

[11] Patent Number: 5,307,398
[45] Date of Patent: Apr. 26, 1994

[54] REMOTE CONTROLLED TONE GENERATOR SYSTEM

[76] Inventors: Joseph Contonzo, 63 Chestnut La., Levittown, N.Y. 11756; John M. Cannata, 1875 W. 7 St., Brooklyn, N.Y. 11223; Gil D'Orazio, 1619 Stevens Ave., Merrick, N.Y. 11566

[21] Appl. No.: 853,571

[22] Filed: Mar. 18, 1992

[51] Int. Cl.⁵ .......................... H04M 1/24; H04B 3/46
[52] U.S. Cl. ........................................ 379/21; 379/31; 379/29
[58] Field of Search ................. 379/6, 21, 24, 29, 102, 379/105, 31

[56] References Cited

U.S. PATENT DOCUMENTS

| | | | |
|---|---|---|---|
| 4,663,775 | 5/1987 | Olek | 379/24 |
| 4,807,277 | 2/1989 | Perry | 379/29 X |
| 4,864,597 | 9/1989 | Fore | 376/6 |
| 4,879,739 | 11/1989 | Forson | 379/21 |
| 4,945,007 | 4/1984 | Forestier et al. | 379/27 |

Primary Examiner—Stephen Chin
Assistant Examiner—Paul Loomis
Attorney, Agent, or Firm—Michael I. Kroll

[57] ABSTRACT

A remote controlled tone generator system is provided that permits a telephone technician to remotely control the operating mode of a test tone generator. This allows the technician to install the test generator at the telephone interface, climb the telephone pole and connect the line test monitor, and remotely control the test generator without having to leave his position on the pole. The test generator can operate in the following modes: direct current for polarity test, steady tone and dual tones for line transmission checks, and off for line noise checks. The remote control unit can be a separate module, or it can be built into a conventional technician handset. Alternatively, the tone generator may be controlled by a conventional telephone keypad.

6 Claims, 1 Drawing Sheet

REMOTE CONTROLLED TONE GENERATOR SYSTEM

BACKGROUND OF THE INVENTION

The instant invention relates generally to the field of telecommunications, and, more specifically, to portable instrumentation used by telephone and communication line technicians.

At the present state of the art, installation technicians have a need to test the telephone line that connects the telephone interface, located inside a business or residence, and the junction box typically located high on a telephone pole, or, similarly, the cable that connects the junction box to the main cable feeder located on another pole. This is illustrated in FIG. 1. There are two basic tests to be performed: 1) testing the line for continuity by detection of tone, and, 2) testing for noise.

At the present state of the art, the test technician must first enter the residence or business to attach a tone generator to the telephone interface, then climb the telephone pole to monitor the signal at the junction box. The technician must then descend from the junction box, re-enter the residence or business and turn off the tone generator to check for dial tone. If noise, static or a ground condition is detected, the tone generator is turned on and the technician returns to the junction box to repeat the process. A similar procedure is followed to test the block cable from the junction box to the main cable feeder.

The procedure wastes a great deal of time, costs the utility or the customer a large excess expense, and causes undue fatigue to the technician. Importantly, it also increases the likelihood of injury to the technician. In addition, access to the junction box is sometimes limited due to business or physical restrictions. For example, a business where the junction box is located may subsequently close.

SUMMARY OF THE INVENTION

It is, therefore, a primary object of the instant invention to provide a remote controlled tone generator system that allows the technician to remotely activate and/or deactivate the test generator from a remote control unit.

Another object is to provide a remote controlled tone generator system where the test modes include a direct current polarity test, a single or a dual tone transmission test, and a null signal test for line noise.

A further object is to provide a remote controlled tone generator system where the remote controlled tone generator is a self contained module and where the remote control unit is a self contained module.

A still further object is to provide a remote controlled tone generator system where the remote controlled tone generator is a self contained module and where the remote control unit is part of a conventional technician handset.

Another object is to provide a remote controlled tone generator system where the tone generator may be controlled from the standard keypad on the handset.

Another object is to provide a remote controlled tone generator system wherein the tone generator may be remotely controlled via radio frequency.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

| DWG. REF. | LIST OF COMPONENTS DESCRIPTION |
| --- | --- |
| 12 | TELEPHONE LINE TO BE TESTED |
| 14 | TELEPHONE INTERFACE |
| 16 | JUNCTION BOX |
| 18 | REMOTE CONTROLLED TONE GENERATOR |
| 20 | TELEPHONE POLE |
| 22 | REMOTE CONTROL UNIT |
| 24 | POWER SWITCH |
| 26 | TEST CLIP |
| 28 | TEST CLIP |
| 30 | TONE GENERATOR CIRCUIT |
| 32 | STEADY/DUAL TONE INPUT |
| 34 | ON/OFF INPUT |
| 36 | TONE/CONTINUITY INPUT |
| 38 | STEADY/DUAL PUSHBUTTON |
| 40 | ON/OFF PUSHBUTTON |
| 42 | TONE/POLARITY PUSHBUTTON |
| 44 | ENCODER CIRCUIT |
| 46 | DECODER CIRCUIT |
| 48 | SWITCHING LOGIC CIRCUIT |
| 50 | CONVENTIONAL KEYPAD |
| 52 | BLOCK CABLE |
| 54 | MAIN CABLE FEEDER |
| 56 | TELEPHONE POLE |

DETAILED DESCRIPTION OF THE PREFERRED EMBODIMENTS

Figure 1:
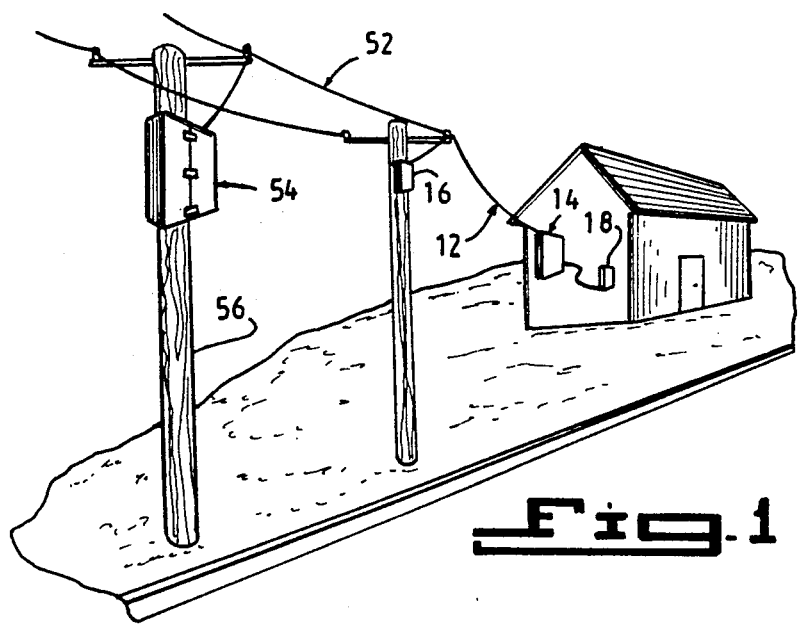
FIG. 1 is a simplified diagram of a typical home telephone line illustrating the need to test the connection between the telephone interface and the junction box.

In FIG. 1, the line 12 to be tested is the connection between telephone interface 14 and junction box 16. Telephone interface 14 is typically provided by telephone utilities as the interface between the company-owned telephone lines and customer owned or leased equipment such as telephones or facsimile machines. During test, the remote controlled tone generator unit 18 is connected to telephone interface 14. The technician climbs telephone pole 20 where he begins to perform his tests.

Figure 2:
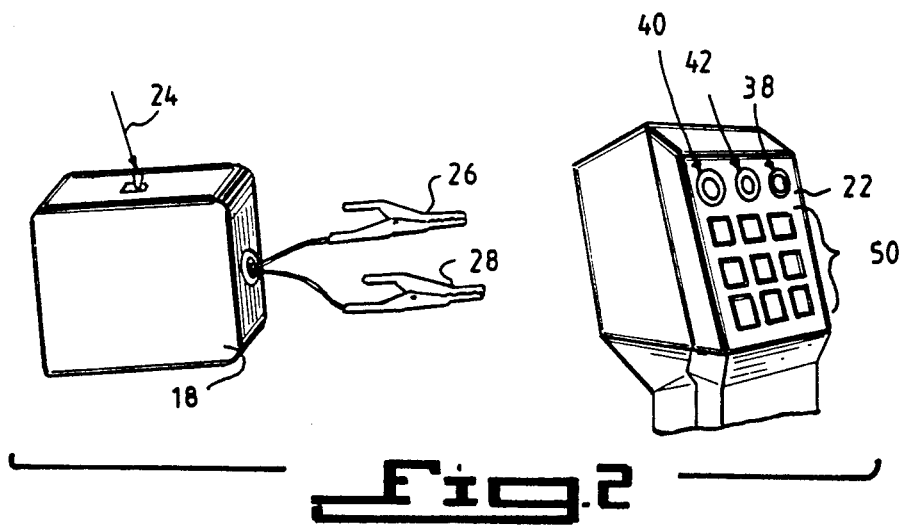
FIG. 2 is a perspective view of the invention illustrating the remote controlled tone generator (on the left) and the remote control unit (on the right). In this figure, the remote control unit is built into a conventional technician handset.
Figure 3:
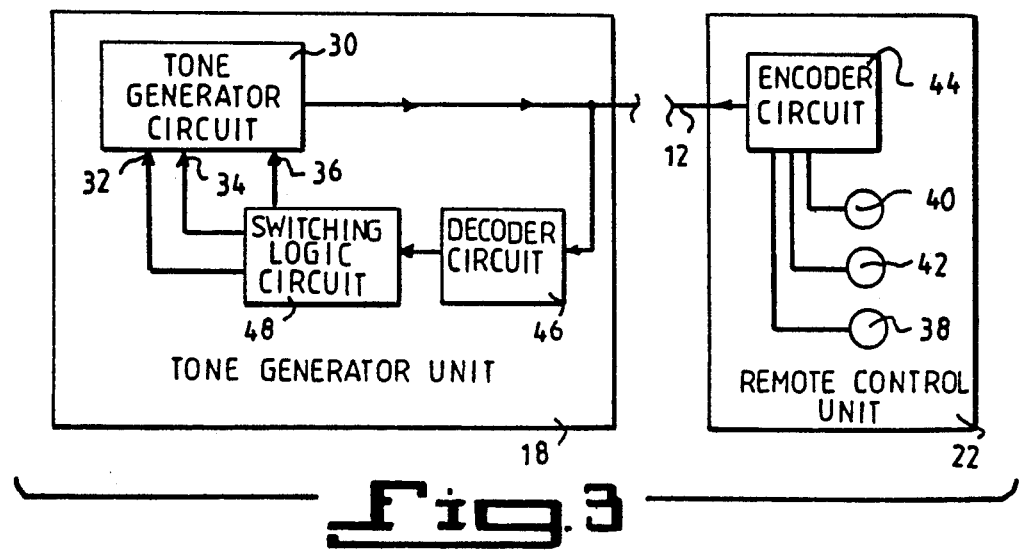
FIG. 3 is a simplified electronic block diagram of the invention.

The operation of the invention itself is best understood with reference to FIGS. 2 and 3. The remote controlled test generator 18 in FIG. 2 corresponds to the block diagram of the tone generator unit 18 in FIG. 3. Likewise, the remote control unit 22 in FIG. 2 corresponds to the block diagram of the remote control unit 22 in FIG. 3. In FIG. 2, the remote controlled tone generator is shown with on/off switch 24 and with test clips 26 and 28 which provide an attachment and detachment means for test generator 18 to the telephone interface 14.

The tone generator circuit 30 is capable of outputting three basic signal types: 1) a dc signal for polarity checks, 2) a single tone audio signal for line transmission checks or a dual tone signal for line transmission checks. The signal mode output is determined by the presence of a logical signal on inputs 32, 34, and 36 which control steady/dual tone, on/off, and tone/polarity respectively. Input 32 controls whether the tone will be a steady tone or a dual tone. Input 34 controls whether the tone generator unit is turned on or off (off is used for a noise test). Input 36 controls whether the output will be a tone or a direct current for polarity checking.

These three inputs 32, 34, and 36, correspond to the steady/dual 38, on/off 40, and tone/polarity 42 pushbuttons respectively. When one of these pushbuttons are depressed, this switch closure is input to the encoder circuit 44 which encodes the closure into a signal that can be transmitted over telephone line 12.

The signal, transmitted via telephone line 12 is decoded by decoder unit 46. The decoded signal is passed to switching logic circuit 48 whose output is one of the three logical signals needed to control the tone generator circuit.

In FIG. 2 the remote control unit is shown installed in a conventional technical handset that already incorporates a multiplicity of pushbuttons 50. Alternatively, the remote control unit could be a separate module altogether.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A communication line testing system for testing a single one of a multiple communication line network including a main cable feeder unit comprising:
   a remotely controlled tone generator, said tone generator including attachable and detachable connection means for the removable connection of said tone generator with a single communication line to be tested;
   a tone generation controller, said controller being connected to said communication line to be tested at a distance from said tone generator, said controller including an encoding and transmitting circuit connected to a plurality of pushbuttons such that when a button is pressed, one of a number of predetermined and specific encoded controller signals is transmitted through said communication line to be tested;
   a tone generation circuit included within said tone generator, said tone generation circuit being capable of outputting a multiplicity of test signals on said communication line to be tested;
   a decoding and logic output circuit connected to both the communication line to be tested and the tone generation circuit such that when one of said predetermined encoded controller signals is received, said decoding logic output circuit activates the tone generation circuit to output a desired test signal; whereby
   said tone generator is controlled remotely from said tone generator controller located at a distance from said tone generator and both the tone generator and the tone generator controller are located a distance from, and on the same side of, the main cable feeder unit.

2. A communication line testing system, as claimed in claim 1, wherein one of the specific encoded controller signals initiates activation/deactivation of the tone generation circuit such that the tone generation circuit can be turned on and off from a remote location allowing for a communication line noise test by the user.

3. A communication line testing system, as claimed in claim 2, wherein one of the specific encoded controller signals initiates a tone/polarity test signal from said tone generation circuit such that a tone is generated when said tone generator is in a test mode and a direct current test signal is generated when said tone generator is in a continuity mode.

4. A communication line testing system as claimed in claim 2, wherein one of the specific encoded controller signals initiates a steady/dual tone test signal from said tone generation circuit such that a signal frequency tone is generated when said tone generator is in the steady mode and an alternating frequency tone is generated when said tone generator is in the dual tone mode.

5. A communication line testing system as claimed in claim 2, wherein both said tone generator and said tone generation controller are separate, self contained modules.

6. A communication line testing system as claimed in claim 5, wherein said tone generation controller is contained within an otherwise conventional telephone technician handset.

* * * * *